W. E. TAYLOR.
COOKING MACHINE.
APPLICATION FILED MAR. 11, 1915.
1,330,456.
Patented Feb. 10, 1920.
3 SHEETS—SHEET 1.
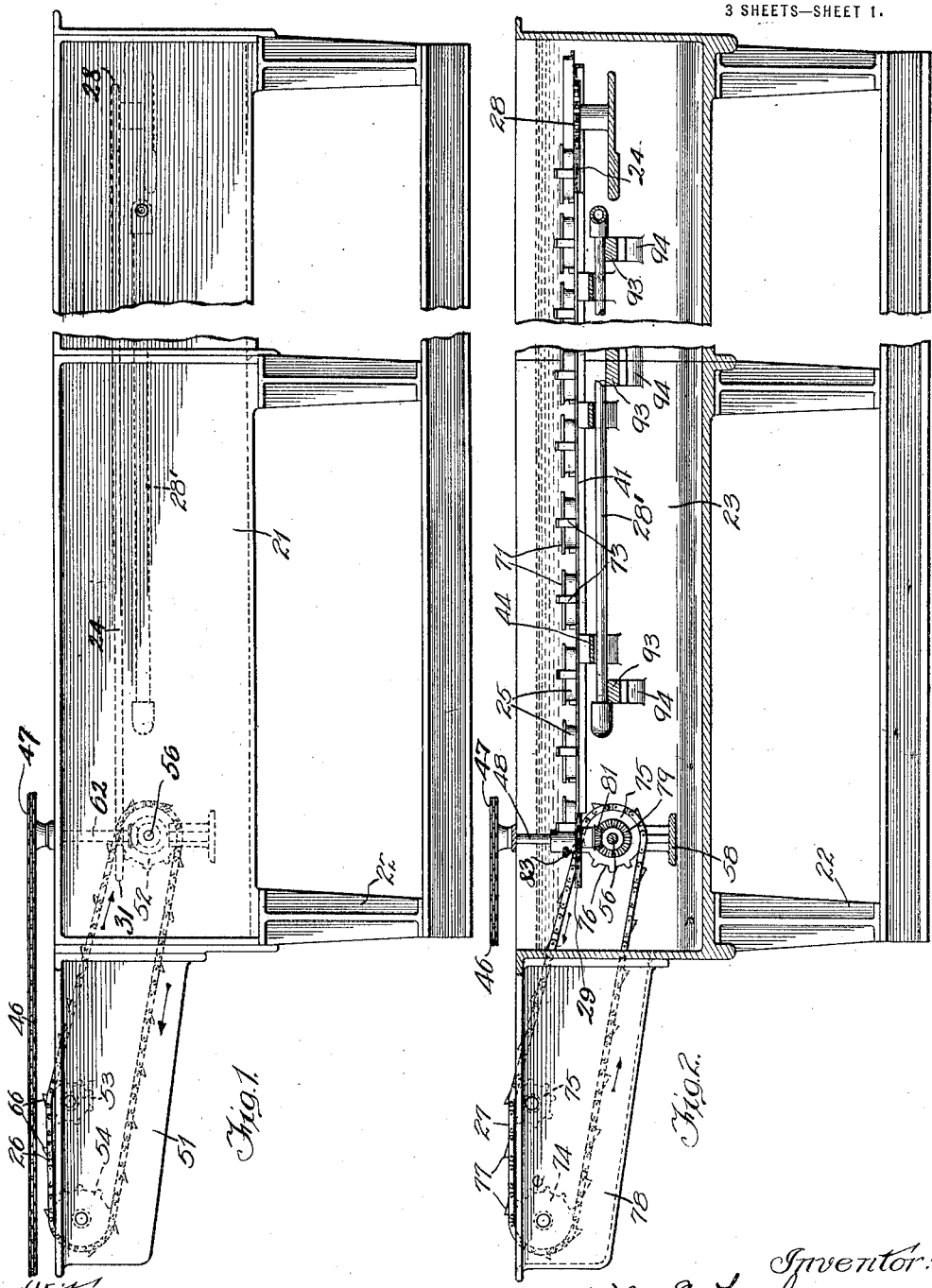

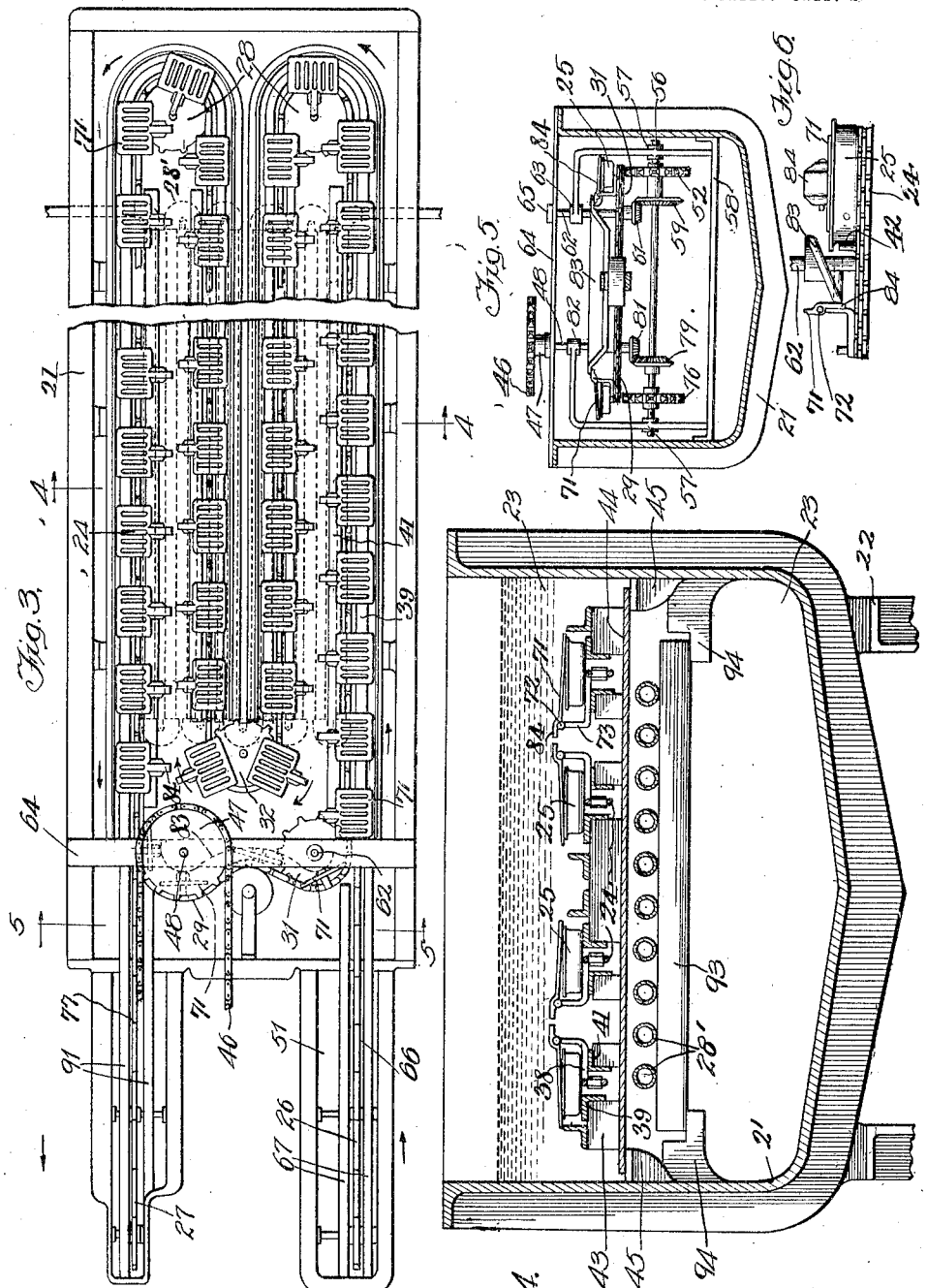

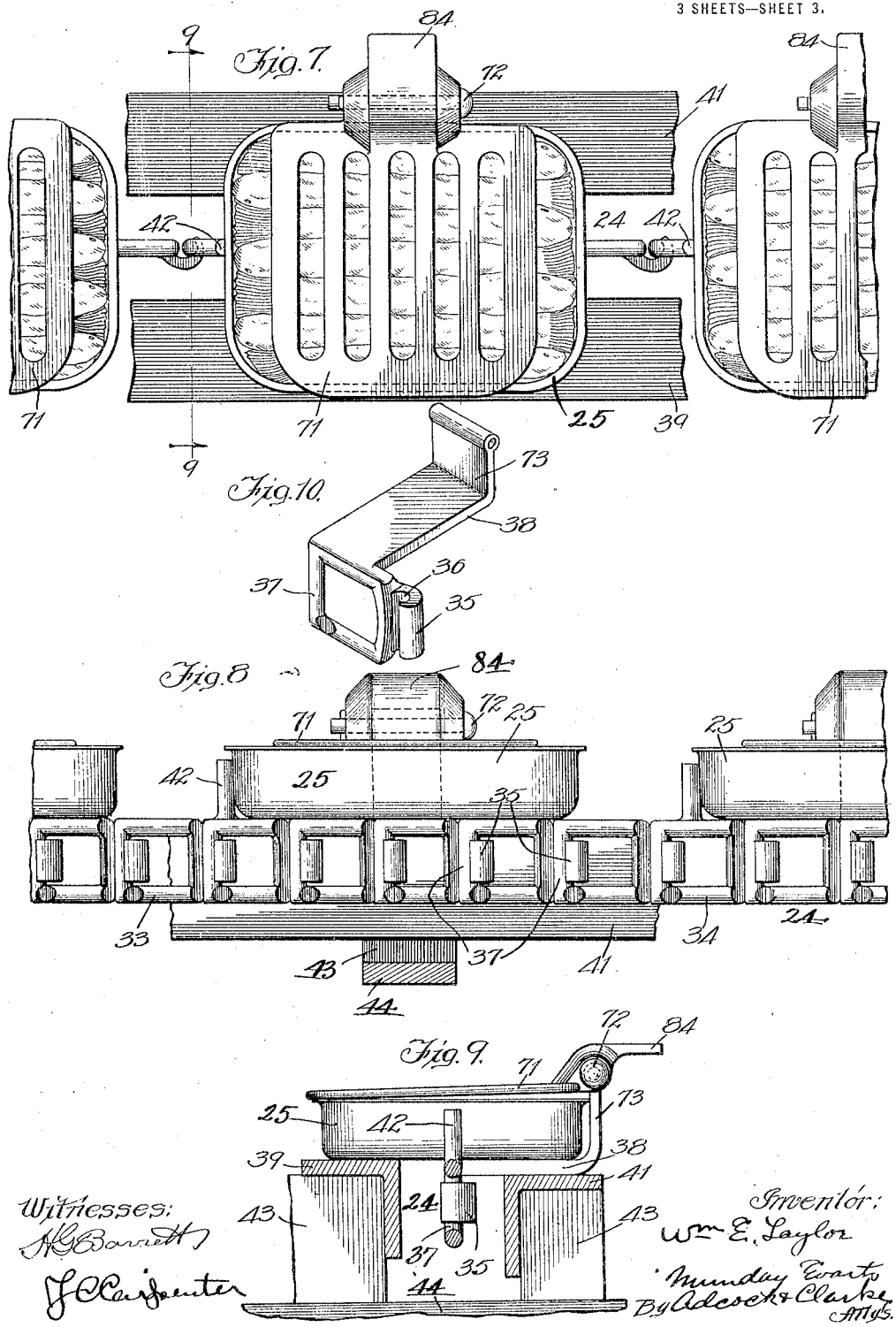

UNITED STATES PATENT OFFICE.

WILLIAM E. TAYLOR, OF NEW YORK, N. Y., ASSIGNOR TO AMERICAN CAN COMPANY, OF NEW YORK, N. Y., A CORPORATION OF NEW JERSEY.

COOKING-MACHINE.

1,330,456.      Specification of Letters Patent.      Patented Feb. 10, 1920.

Application filed March 11, 1915. Serial No. 13,799.

*To all whom it may concern:*

Be it known that I, WILLIAM E. TAYLOR, a citizen of the United States, residing in New York, in the county of New York and State of New York, have invented a new and useful Improvement in Cooking-Machines, of which the following is a specification.

My invention relates in general to cooking machines and has more particular reference to apparatus provided for the cooking of sardines and the like after they have been placed in the can, although it will be apparent as it is better understood, that the invention has a wider application and is well adapted for other uses.

Prior to my invention it has frequently been the custom to cook sardines before they are placed in the can. This method has been productive of considerable annoyance and waste by reason of the softened condition of the fish after cooking and before canning. A package of sardines, to be successful commercially, must appear tightly packed with the skins unbroken when the can is opened, and this condition is much more readily attainable when the sardines are packed in the can raw and subsequently cooked. Sardines are not infrequently packed in olive or other oils which form good cooking or frying agents and it is the purpose of this invention to provide an apparatus which will receive open cans packed with a proper number of raw sardines and apply the proper filling of oil and at the same time cook or fry the sardines, delivering the cans of cooked material ready to be headed up for shipment.

It is a further object of the invention to provide such an apparatus or machine which will accomplish these results automatically, it only being necessary to feed in the cans filled with uncooked material at one point and to receive them out of the machine or apparatus cooked and ready for heading at another which may be done mechanically or manually without departing from the spirit and scope of this invention.

An additional object of the invention is to provide a machine or apparatus, which, while accomplishing these and other purposes, may be economically constructed and operated.

Other objects and advantages of the invention will be apparent as it is better understood from the following description when considered in connection with the accompanying drawings illustrating a preferred embodiment thereof.

On the drawings—

Figure 1 is a side elevation with the central portion broken away, of a machine embodying my invention.

Fig. 2 is a central, longitudinal sectional view of the same.

Fig. 3 is a top plan view of the same.

Fig. 4 is an enlarged, transverse, vertical, sectional view taken substantially on the line 4—4 of Fig. 3.

Fig. 5 is a vertical, transverse, sectional view taken substantially on the line 5—5 of Fig. 3.

Fig. 6 is a detailed, side elevation of the means provided to lift the retainers to a can-releasing and receiving position.

Fig. 7 is an enlarged, partial top plan view of the immersed conveyer.

Fig. 8 is a side elevation of the same.

Fig. 9 is a sectional view taken substantially on the line 9—9 of Fig. 7; and

Fig. 10 is an enlarged perspective view of one of the supports for the containers.

The machine embodying my invention and shown on the drawings comprises a receptacle or body 21 mounted upon a suitable supporting base 22. The receptacle 21 consists of a large, elongated tank adapted to contain a relatively large quantity of oil or other appropriate liquid 23. This tank, in the present instance, is substantially rectangular and is provided with a continuously moving conveyer 24 which will be later described more in detail. This conveyer moves continuously within the receptacle or tank about a circuitous path of sufficient length to permit proper cooking of the materials. It is located a sufficient distance beneath the top of the bath of liquid to permit the liquid to enter the open tops of containers 25 carrying the sardines or other matter to be cooked. These containers are fed continuously to the conveyer by a delivery conveyer 26 and are removed after the cooking operation is complete by a delivery conveyer 27. Heating coils 28' are provided within the oil or other fluid bath 23.

The conveyer 24 consists, in the present instance, of a link chain having flattened, vertically disposed links adapted to be engaged by sprocket wheels at various points throughout its travel. In the present instance, five such sprocket wheels are provided, two at 28 mounted in one end of the tank, two, 29 and 31, mounted near the other end, and one, 32, mounted adjacent the end with the sprocket wheels 29 and 31 but positioned inwardly thereof. The conveyer is shown in detail in Figs. 7 to 10 in which it will be noted that the chain 33 consists of rectangular links 34 of rounded stock, each link having a lip 35 extending from one side of the link and recessed at 36 to embrace a side 37 of an adjacent link, its opposite side 37 being engaged with a similar lip 35 of the link on the other side. At intervals, supports for the containers 25 are provided, these supports consisting, in the present instance, of a flattened projection 38 extending laterally from the top portion of an appropriate link. The container rests partly upon this support and partly upon a guide 39 positioned along one side of the effective travel of the conveyer. A similar guide 41 is provided on the other side on a slightly lower level and upon this guide the projection 38 rides, the two guides 39 and 41 serving to steady the containers while moved by the conveyer and to provide a channel between them in which the conveyer chain 33 may move. Extending upwardly from appropriate links are studs 42 each adapted to engage behind a container resting upon the support 38 and cause it to advance with the conveyer. The supports 39 and 41 may be formed of angle iron having a smooth surface and mounted upon blocks 43 secured on a shelf 44 which in turn rests upon lugs 45, the edges of the shelf 44 being spaced from the adjacent walls of the receptacle to permit ready circulation of the oil or other heated liquid.

The conveyer 24 receives its movement from a sprocket chain 46 meshing with a sprocket wheel 47 secured upon the end of a shaft 48, which shaft 48 passes through the sprocket wheel 29 which is in mesh with the conveyer and causes the sprocket wheel 29 to move with the sprocket wheel 47. The sprocket chain 46 is moved continuously by any suitable source of power (not shown) and imparts thereby a continuous movement to the conveyer 24 causing the conveyer to move in the direction of the arrows in Fig. 3.

Cans filled with sardines or other material are fed to the conveyer 24 by the feed conveyer 26. This conveyer moves in a communicating extension 51 of the receptacle 21 and takes over a driving sprocket wheel 52 and idle sprocket wheels 53 and 54, the sprocket wheels 53 and 54 being positioned to cause the conveyer 26 to pass above the top of the extension horizontally through a portion of its travel. The sprocket wheel 52 is mounted loosely upon a shaft 56 carried in bearing members 57 (Fig. 5) supported from a cross member 58 secured near the bottom of the receptacle or tank and this sprocket wheel is provided with a beveled gear 59 secured on its inner face, which beveled gear meshes with a beveled pinion or gear 61 fast upon the end of a shaft 62 which is secured to the sprocket wheel 31 about which the conveyer 24 is trained. The shaft 62 is disposed through a bearing 63 in the bearing member 57 and through a support 64 extending across and secured to the top of the receptacle or tank 21. The head of the shaft is enlarged, as indicated at 65, to retain the parts in the elevated position shown.

The continuous movement of the immersed conveyer will therefore impart a continuous movement to the delivery or feed conveyer 26 in the direction of the arrows in Fig. 1. In this view it will be noted that at the beginning of its travel toward the tank, the conveyer moves horizontally between the sprocket wheels 53 and 54 and from the sprocket wheel 53 to the sprocket wheel 52 downwardly at an angle to adjacent the immersed conveyer. Suitable stops 66 extend outwardly from the conveyer and these stops are arranged to engage behind cans placed upon the conveyer at the horizontal portion of its travel and deliver them to the supports 38 of the immersed conveyer, said stops being so arranged that one will arrive at the bottom of the travel each time a support 38 comes into position to receive a can.

Combined guides and stationary supports 67 are positioned on opposite sides of the forward travel of this delivery conveyer to maintain the cans in correct position thereon while being fed into the machine. The supports 38 come into position to receive the cans and ready for their reception and, as soon as the supports pass the receiving point, a means for preventing the contents of the cans from floating out is brought into action. In the present instance, this means consists of a hinged grid, or cover 71 pivoted at 72 to an upwardly extending projection 73 on each support, the grid being preferably of the general configuration shown in Figs. 3 and 7 and adapted to normally rest on the top edges of the can containing the material, the grids being of sufficient weight to prevent their being lifted by the buoyancy of the contents of the can. These grids rest upon the cans throughout the effective travel of the immersed conveyer and until the supports 38 come into position to discharge the cans to the delivery conveyer 27. This last-mentioned conveyer is like the conveyer 26 and is similarly mounted on sprocket wheels 74, 75 and 76 (Fig. 2) and passes through an extension 78 communicating with the receptacle 21. The conveyer, however, moves in the opposite direction or that shown by the arrows in Fig. 2 and the stops 77 are positioned to engage behind the cans carried by the immersed conveyer as fast as they arrive at the discharge point. The conveyer 27 receives its motion from a beveled gear 79 fixed upon the shaft 56 and engaging a bevel gear 81 fixed upon the lower end of the shaft 48, the shaft 48 being mounted in a bearing 82 in an appropriate bearing member 57 (Fig. 5). The shaft is held in the lifted position shown by the sprocket wheel 47. The sprocket wheel 76 is fast upon the shaft 56 so that movement of the sprocket wheel 47 through the shaft 48, beveled gears 81 and 79 and shaft 56 imparts a continuous movement to the discharge conveyer 27.

As the cans, after having passed four times for substantially the length of the tank and completed the cooking of the contents, arrive at the sprocket wheel 29, they are picked up by the stops 77 of the discharge conveyer, the grids 71 being lifted about their pivotal connections with the supports for this purpose. This elevation of the grids is accomplished by a stationary cam guide 83 (Figs. 2, 3, 5 and 6) extending between the discharge and receiving ends of the effective travel of the immersed conveyer. Upon each grid and extending rearwardly of its pivotal axis is a lug 84 adapted to engage under this guide and be pressed downwardly to lift the grid (Fig. 6), the guides serving to maintain the grid in raised position until it has passed the receiving end of the effective travel by continuing the pressure on the lug and holding it in the lifted position shown in the case of three grids, in dotted lines, and one grid in full lines, at the receiving and delivering end of Fig. 3. As the cans are picked up after the cooking operation by the delivery conveyer 27 they slide upwardly on guides 91 to the horizontal portion of the travel of the conveyer which extends upon the extension 78, where they are removed. In moving upwardly to this portion the cans are tilted somewhat so that some of the oil may run out. By varying the inclination the amount of oil left within the cans may be varied and a proper content thus obtained.

The oil within the receptacle 21 is heated in any suitable manner, steam coils 28' being shown in the present instance. These coils are disposed just beneath the immersed conveyer and rest upon horizontal, transverse members 93 (Fig. 4) supported at intervals by suitable lugs 94 forming a part of the side walls of the receptacle.

It will be manifest that the whole operation of the machine described is automatic except the placing of the cans on the conveyer 26 and their removal from the guides 91. Automatic machinery may, of course, be provided for these steps also without departing from my invention and it will be obvious that various changes may be made in the improvement, construction and arrangement of the parts described, without departing from the spirit and scope of the invention or sacrificing any of its material advantages, the form disclosed being merely a preferred embodiment thereof.

I claim:—

1. In a cooking machine, in combination: a receptacle for the cooking liquid having at the same end two parallel inclined portions through which the cans to be treated may be carried down into said receptacle, and may be carried up out of it, respectively; an endless conveyer having mounting and actuating means whereby it is caused to traverse said receptacle from end to end, and provided with means for engaging and carrying the cans; and a downwardly inclined receiving conveyer arranged in one of said inclined portions of the receptacle and having means for delivering the filled cans to the first mentioned conveyer; and a delivering conveyer arranged in the other inclined portion of the receptacle and arranged to disengage the cans from the first mentioned conveyer and elevate them from the receptacle.

2. In a cooking machine, in combination: a receptacle for the cooking liquid; three chain wheels arranged on vertical axes within and near one end of said receptacle; two chain wheels arranged within the other end of said receptacle; an endless conveyer mounted on said five chain wheels and having means for engaging and propelling cans; and separate inclined receiving and delivering conveyers having means respectively for delivering cans to the first mentioned conveyer, and for disengaging cans therefrom.

3. In a cooking machine, in combination: a receptacle for the cooking liquid; an endless conveyer having mounting and propelling means whereby it circulates in horizontal planes within said receptacle; a separate receiving conveyer arranged to carry cans down into said receptacle and deliver them to the horizontal conveyer; a delivering conveyer arranged to take cans from said horizontal conveyer and elevate them from the receptacle; means on all of said conveyers for engaging and propelling cans; and mechanism for actuating the several conveyers in proper time relative to each other whereby the cans are automatically transferred from one conveyer to another.

4. In a cooking machine, in combination, a receptacle for a cooking liquid having two parallel inclined portions leading down into the receptacle and up out of the same, said inclined portions being arranged near together for the entrance and the exit of cans and contents to be cooked at the same end of the machine, and can conveying means occupying the ingoing incline and a circuitous path within the receptacle and the outgoing incline.

5. In a cooking apparatus, in combination, a receptacle for a heated cooking liquid, an endless conveyer chain mounted to be moved in said liquid and having can-propelling lugs and having near said lugs arms extending from under the cans, can-holding and covering grids pivoted on said arms, and automatic means for operating said grids to cover and to release the cans.

6. In a cooking machine, in combination: a receptacle for the cooking liquid; an endless conveyer having mounting and propelling means whereby it circulates in horizontal planes within said receptacle; a separate receiving conveyer arranged to carry cans down into said receptacle and deliver them to the horizontal conveyer; a delivering conveyer arranged to take cans from said horizontal conveyer and elevate them from the receptacle; means on all of said conveyers for engaging and propelling cans; mechanism for actuating the several conveyers in proper time relative to each other whereby the cans are automatically transferred from one conveyer to another; partly open and movable can-covering grids attached to the horizontal conveyer; and devices for moving said grids to permit the reception and delivery of cans by said horizontal conveyer.

7. A cooking machine comprising, in combination: a receptacle containing a heated liquid, a continuously moving conveyer disposed within said receptacle beneath the surface of said liquid and mounted to circulate in substantially horizontal planes both longtudinally and laterally and separate and continuously moving conveyers for delivering containers containing the material to be cooked to said immersed conveyer for cooking and for removing said containers from said receptacle after cooking.

8. A cooking machine comprising, in combination: a receptacle containing a heated liquid, a conveyer immersed in said liquid and adapted to carry containers containing the matter to be cooked and mounted to circulate in substantially horizontal planes both longitudinally and laterally, and a separate delivery conveyer having a travel immersed at an end in said liquid adjacent said immersed conveyer and rising above the surface of said liquid for delivering said containers after the cooking operation out of said receptacle automatically.

9. A cooking machine comprising, in combination: a receptacle containing a heated liquid, a conveyer immersed in said liquid and adapted to carry containers containing the matter to be cooked and mounted to circulate in substantially horizontal planes both longtudinally and laterally, and a separate delivery conveyer having a travel immersed at an end adjacent said immersed conveyer and rising above the surface of said liquid for delivering said containers after the cooking operation out of said receptacle automatically, said last mentioned conveyer being adapted to retain said containers in predetermined inclined position to leave a desired amount of cooking liquid in said containers after delivery.

10. A cooking machine comprising, in combination, a receptacle containing a heated liquid and a conveyer adapted to move continuously through said liquid about a circuitous substantially horizontal path, a separate delivery conveyer located at an end of said receptacle and adapted to deliver matter to be cooked to said circuitously moving conveyer and a separate discharge conveyer also located at an end of said receptacle for delivery of said containers from said receptacle after cooking, said conveyers having can-engaging means moving in time with each other.

11. A cooking apparatus comprising, in combination, a receptacle, means for introducing cans containing material to be cooked into said receptacle, a heated liquid in said receptacle adapted to cook said material and to form a filling for said can, endless flexible conveying means movable longitudinally and laterally in said receptacle for circulating said cans both longitudinally and laterally beneath the surface of the liquid, and means for removing the cans from said receptacle after cooking and after regulating the amount of filling material removed from and in the cans.

12. A cooking apparatus, comprising, in combination: a receptacle, means for introducing cans filled with uncooked material into said receptacle, a heated liquid in said receptacle adapted to cook said material and to form a filler for said cans, endless flexible conveying means movable longitudinally and laterally in said receptacle for circulating said cans both longitudinally and laterally beneath the surface of the liquid, and means for tilting the cans and lifting them from the receptacle to regulate the amount of liquid removed with and in said cans.

13. In a cooking machine, in combination: a receptacle for the cooking liquid; an endless conveyer having mounting and propelling means whereby it circulates in horizontal planes within said receptacle; a separate receiving conveyer arranged to carry cans down into said receptacle and deliver them to the horizontal conveyer; a delivering conveyer arranged to take cans from said horizontal conveyer and elevate them from the receptacle; means on all of said conveyers for engaging and propelling cans; mechanism for actuating the several conveyers in proper time relative to each other whereby the cans are automatically transferred from one conveyer to another; movable can-covering means attached to the horizontal conveyer; and devices for moving said covering means to permit the reception and delivery of cans by said horizontal conveyer.

Signed this 3rd day of October, 1914, in the presence of two subscribing witnesses.

WILLIAM E. TAYLOR.

Witnesses:
W. D. FOSTER,
J. C. CARPENTER.